United States Patent

Pattarozzi

[11] Patent Number: 5,116,195
[45] Date of Patent: May 26, 1992

[54] DEVICE FOR FORMING VERTICAL PILES OF ITEMS

[75] Inventor: Domenico Pattarozzi, S. Lazzaro di Savena, Italy

[73] Assignee: PRB Packaging Systems S.R.L., Bologna, Italy

[21] Appl. No.: 643,734

[22] Filed: Jan. 22, 1991

[30] Foreign Application Priority Data

Jan. 26, 1990 [IT] Italy .................. 3318 A/90

[51] Int. Cl.⁵ .......................... B65G 57/03
[52] U.S. Cl. ..................... 414/790.3; 414/789.9; 414/794.7; 198/740
[58] Field of Search ............. 414/790.3, 788.9, 789.1, 414/789.9, 790.8, 792.7, 794.4, 794.7, 798.5, 798.6, 798.7, 793.5, 793.6, 793.7, 744.3, 744.7; 198/468.1, 740

[56] References Cited

U.S. PATENT DOCUMENTS

| | | | |
|---|---|---|---|
| 3,374,902 | 3/1968 | Mills ..................... | 414/789.1 |
| 3,866,905 | 2/1975 | Trogan et al. ........... | 414/798.6 X |
| 3,959,951 | 6/1976 | Paules ................... | 414/794.4 X |
| 3,994,387 | 11/1976 | Zappia .................. | 198/740 X |
| 4,164,278 | 8/1979 | Gurioli .................. | 198/740 X |
| 4,511,300 | 4/1985 | Lampe et al. ........... | 414/789.9 X |
| 4,589,812 | 5/1986 | Meives et al. .......... | 414/794.7 X |
| 4,744,460 | 5/1988 | Pazzaglia ............... | 198/740 |
| 4,902,184 | 2/1990 | Fritz .................... | 414/790.3 |
| 4,944,138 | 7/1990 | Aiuloa et al. ........... | 414/794.7 X |
| 4,992,016 | 2/1991 | Ferloni ................. | 414/789.9 X |

FOREIGN PATENT DOCUMENTS 15352  1/1985  Japan ..................... 414/789.9

Primary Examiner—Frank E. Werner
Assistant Examiner—Brian K. Dinicola
Attorney, Agent, or Firm—Darby & Darby

[57] ABSTRACT

In a device for forming vertical piles of items, coming from a feeding line, a pair of conveyor belts set side by side, at the end of the feeding line translate the items downwards onto a plane disposed beneath, while a pusher moves vertically in order to push the items coming from the feeding line towards the belts; a frame is made to horizontally and vertically move to engage with the support plane, in a transfer phase, and to move beneath the plane, in a return phase; the frame is also suited to support a subsequent pile being formed during the transfer phase and to allow the descent of the pile being formed on the support plane during the return phase.

10 Claims, 4 Drawing Sheets

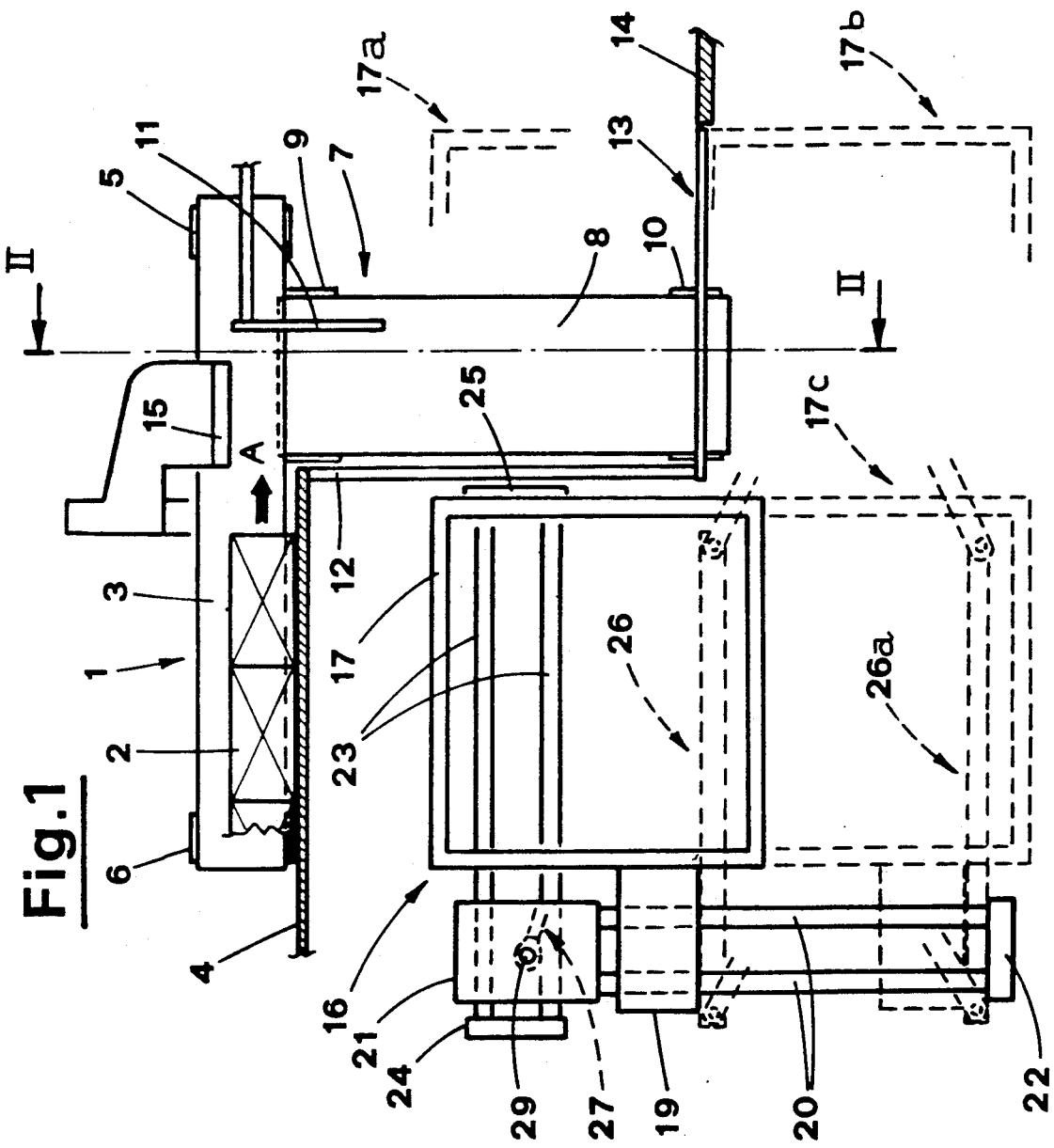
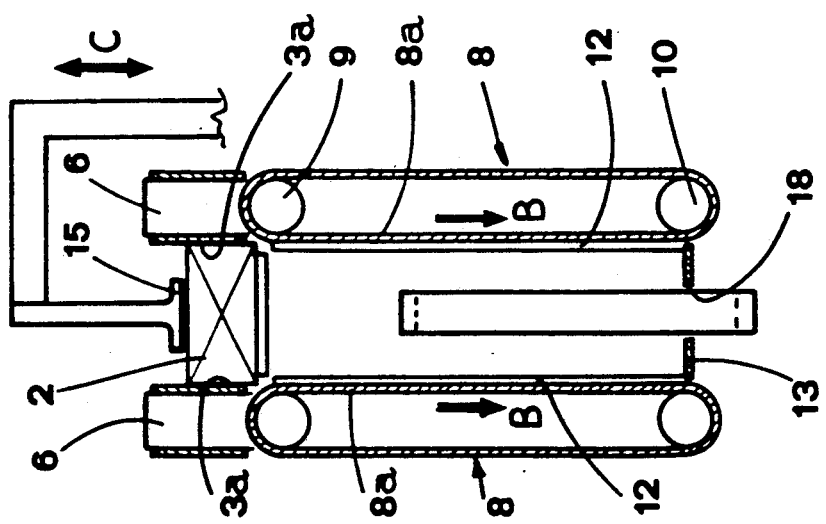

DEVICE FOR FORMING VERTICAL PILES OF ITEMS

BACKGROUND OF THE INVENTION

The present invention relates to the technical field concerning the formation of vertical piles of items coming in an orderly sequence from a horizontal feeding line.

DESCRIPTION OF THE PRIOR ART

There are known automatic machines of various types for the packaging of various items, e.g. of a box type, which have to be grouped in piles or stacks for the subsequent insertion into suitable containers and the like. Therefore, such machines are usually fitted with devices designed for forming the piles of items coming from the feeding line.

A known device of this kind is described in the European Patent EP-A-36398. Said device basically comprises a station located downstream of the item feeding line, having the purpose of forming a longitudinal layer of items arranged close together, and subsequently transferring said layer either on a plate underneath or on the top layer of the pile being formed on the same plate.

In the European Patent EP-A-104149 is disclosed a further device carrying out the same function mentioned above through a different technical solution.

Said solution provides for a station, designed for forming a longitudinal layer of items arranged close together and subsequently transferring said layer either on a plate underneath or on the upper layer of the pile being formed on the same plate, which comprises: a pair of rollers set side by side extending longitudinally at the same height starting from a feeding line of said items so to place themselves, with the relative facing surfaces, at a mutual distance not lower than the transverse dimension of said items; means for the intermittent motorization of said rollers according to counter-rotating directions with equal instantaneous speeds and between rest positions equal to each other, each of them obtained from the previous one by a revolution of the same shafts; two longitudinal side boards, each of which is externally fastened to a corresponding roller and located with one of its ends close to the first station, with said side boards forming, with the relative rollers in the rest position, a horizontal channel receiving the items coming from said line and supporting the lower longitudinal edges of these latter according to a plane coplanar to the support base of said line; means to sense the formation of a layer in said channel and to actuate said motorizing means subsequently; means to sense the rest position of said rollers subsequent to a transfer of a layer of items on said plate or on the upper layer of the pile being formed on the same plate; movable intercepting means located close to the vertical plane separating said first and second station, interlocked with said rollers and taking two characteristic positions, respectively of noninterception and of interception of the first items of the row of items lying on said line correspondingly in synchronism with the rest positions of said rollers; means to regulate the longitudinal extension of the layer being formed in said channel; means to regulate the mutual distance between said rollers; means to guide vertically the transverse side boards of the pile being formed on said plate; means to feed and/or to guide vertically the longitudinal side boards of said pile; sensor means to control the vertical motorizing means of said plate interlocked with the motorizing means of said shafts.

The documents GB-A-1576652 and FR-A-2121647 also disclose devices wherein the layers of items just formed are transferred on an underlying support without the same articles being subjected to vertical compressions.

SUMMARY OF THE INVENTION

The object of this invention is to provide a device which makes it possible to form a vertical pile, or stack, of items first, and then to transfer said pile to conventional cartoning means or the like, thus ensuring a continuous working so to achieve a high productivity.

Another object of this invention is to provide a device for forming vertical piles of orderly items made through a technical solution which turns out to be simple, functional and reliable, as well as of versatile use.

The objects mentioned above are achieved by means of a device for forming vertical piles of items comprising means to translate downwards items coming from a feeding line onto a plane located beneath the translating means, while pushing means push the items coming from the feeding line towards the translating means.

Further there are means provided with a frame which is movable according to a horizontal direction and to a vertical direction and suited to transfer the pile formed on the support plane.

These last means engage with the support plane, in a transfer phase, and move below the plane, in a return phase, so that they support the subsequent pile being formed during the transfer phase and allow the descent of the pile being formed on the support plane during the return phase.

BRIEF DESCRIPTION OF THE DRAWINGS

The features of this invention will be described further, by way of example, with reference to the specification and the accompanying drawings, wherein:

FIG. 1 is a side view of the device for forming vertical piles of orderly items conforming to the invention;

FIG. 2 is a section view according to the line II—II of FIG. 1;

DESCRIPTION OF THE PREFERRED EMBODIMENT

Figure 4:
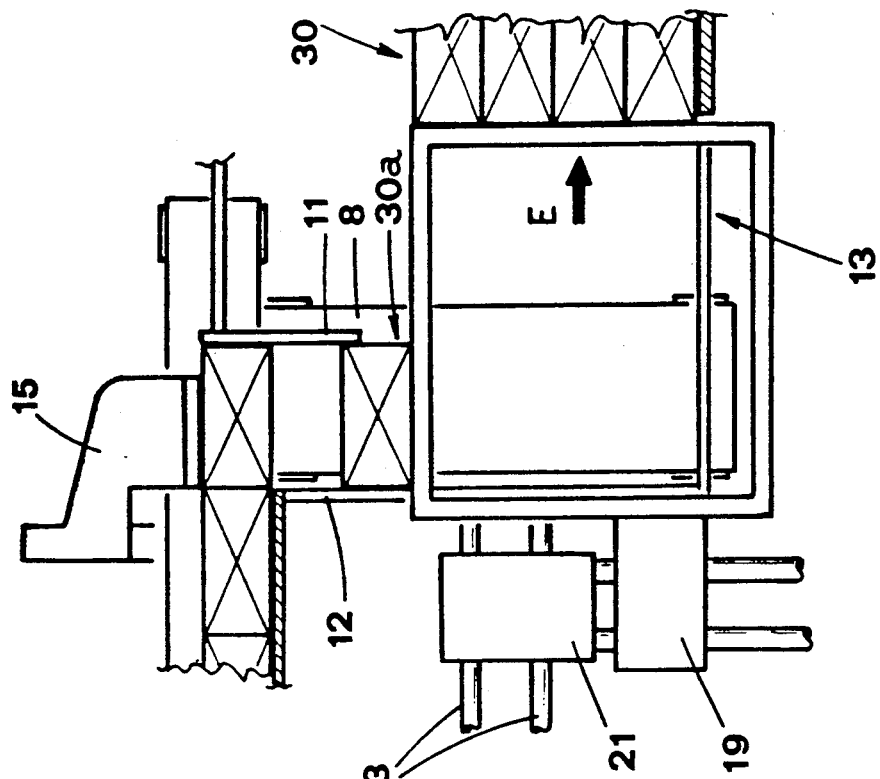
FIGS. 3, 4, 5 and 6 show, in a partial side view, subsequent working phases of the device.

Referring to the above-mentioned figures, the numeral 1 generally designates the line feeding the items 2 to be disposed in vertical piles through the device provided by the present invention.

The feeding line 1 comprises a pair of conveyor belts 3 set side by side longitudinally and located beside a plane 4 supporting the items 2. The conveyor belts 3 wind themselves at their opposite ends round two respective rollers 5, 6 with vertical axis. The belts 3 are moved by known motive means, not illustrated in the drawing, in such a way that the relative sections 3a, facing each other, move in the advancing sense A. The items 2, packaged e.g. in box-type cartons, are taken between and conveyed by the facing sections 3a of the conveyor belts 3. The items 2 advance in an orderly row, arranged close together.

The device for forming the piles 2 comprises, downstream of the feeding line 1, means 7 to translate the items 2 from above downwards, according to a vertical axis.

The translating means 7 comprise a, further pair of conveyor belts 8 disposed vertically side by side and lying on the same vertical planes as the corresponding horizontal belts 3. The conveyor belts 8 wind themselves on a respective pair of rollers 9, 10 with horizontal axis and are actuated in such a way that the relative sections 8a, facing each other, move downwards, as indicated by the arrow B.

The horizontal conveyor belts 3 extend over the vertical conveyor belts 8. Correspondingly with said zone, between the belts 3 and 8 a ledge 11 is provided, against which the items 2 coming from the feeding line 1 are going to strike. The ledge 11 has a position which is adjustable in a direction longitudinal to the line 1, according to the dimensions of the items 2.

In front of the ledge 11 is located a pair of stationary shoulders 12, which extend beneath the front end of the support plane 4 of the line 1.

The translating means 7 are provided at the bottom with a plane 13 supporting the pile being formed, located between the vertical belts 8. The support plane 13 is coplanar to a plane 14 correspondingly with which operate conventional means for moving the piles away, not illustrated in the drawing, e.g. for the insertion into suitable containers.

On top of the translating means 7 is located a pushing means 15 which is suited to carry out the transfer of the items 2 from the horizontal conveyor belts 3 to the vertical conveyor belts 8.

The pusher 15 is set in reciprocating motion according to a vertical axis, as indicated by the arrow C, in a suitable relationship of phase with the advancing of the items 2 along the feeding line 1.

With the translating means 7 are suited to cooperate means for transferring the pile just formed, generally designated by the numeral 16. Said transfer means 16 comprise a frame 17 which is movable on a plane vertically middle to the conveyor belts 3 and 8. Corresponding to said vertical plane, the support plane 13 presents a longitudinal slot 18, wherein the same frame 17 is suited to be caught.

At the rear, the frame 17 is fitted with a body 19 through which it is slideably guided on a pair of vertical guides 20; the vertical guides 20 are mounted between a pair of heads 21, 22, respectively upper and lower. In its turn, the upper head 21 of the guides 20 is slideably guided on a pair o horizontal guides 23, disposed longitudinally to the line 1 and mounted between respective heads 24, 25. The sliding in vertical sense of the frame 17, on the guides 20, is actuated through an articulated-parallelogram means, partially represented by the line 26 of short dashes; the means 26 acts on the body 19 of the frame 17. The sliding in horizontal sense of the frame 17, on the guides 23, is actuated through known means 27 which engage with a pivot 29 protruding transversely from the upper head 21 of the guides 20.

The items 2 conveyed in an orderly sequence by the conveyor belts 3 of the feeding line 1 advance until they strike against the front ledge 11; in such a position the first item of the row, no more supported by the support plane 4 of the line 1, is disposed over the translating means 7.

Figure 3:
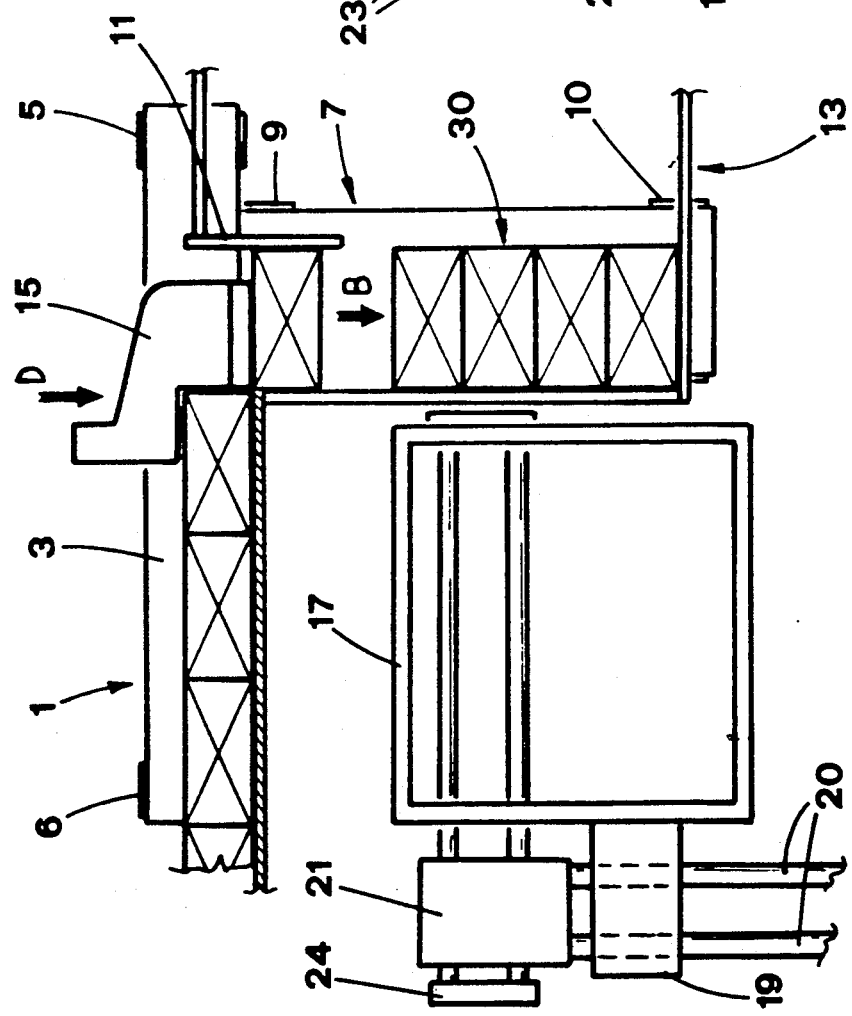

Thus the downward movement of the pusher 15 (arrow D) pushes said item between the conveyor belts 8 of the translating means 7, as illustrated in FIG. 3. The item is then conveyed downwards by the belts 8, and it is placed on top of the pile being formed on the support plane 13. When the pile has reached the height required, the frame 17 is caused to advance to the position indicated by the line 17a of short dashes line 17a in FIG. 1; said advancing is caused by the sliding of the head 21 on the horizontal guides 23 brought about by the angular rotation of said means 27. The frame 17 is caught by the slot 18 of the support plane 13, pushing the pile just formed, designated by the numeral 30 for the sake of clarity, on the moving-away plane 14, as indicated by the arrow E in FIG. 4.

During said transfer phase, the items 2 conveyed by the vertical conveyor belts 8 go to rest upon the upper surface of the frame 17, so starting the formation of the subsequent pile of items, designated by the numeral 30a.

When the transfer has been completed, the frame 17 is caused to descend to the position indicated by the short dashes line 17b in FIG. 1, through the sliding on the vertical guides 20 actuated by the articulated means 26, which in its turn moves to the low position 26a.

Figure 5:
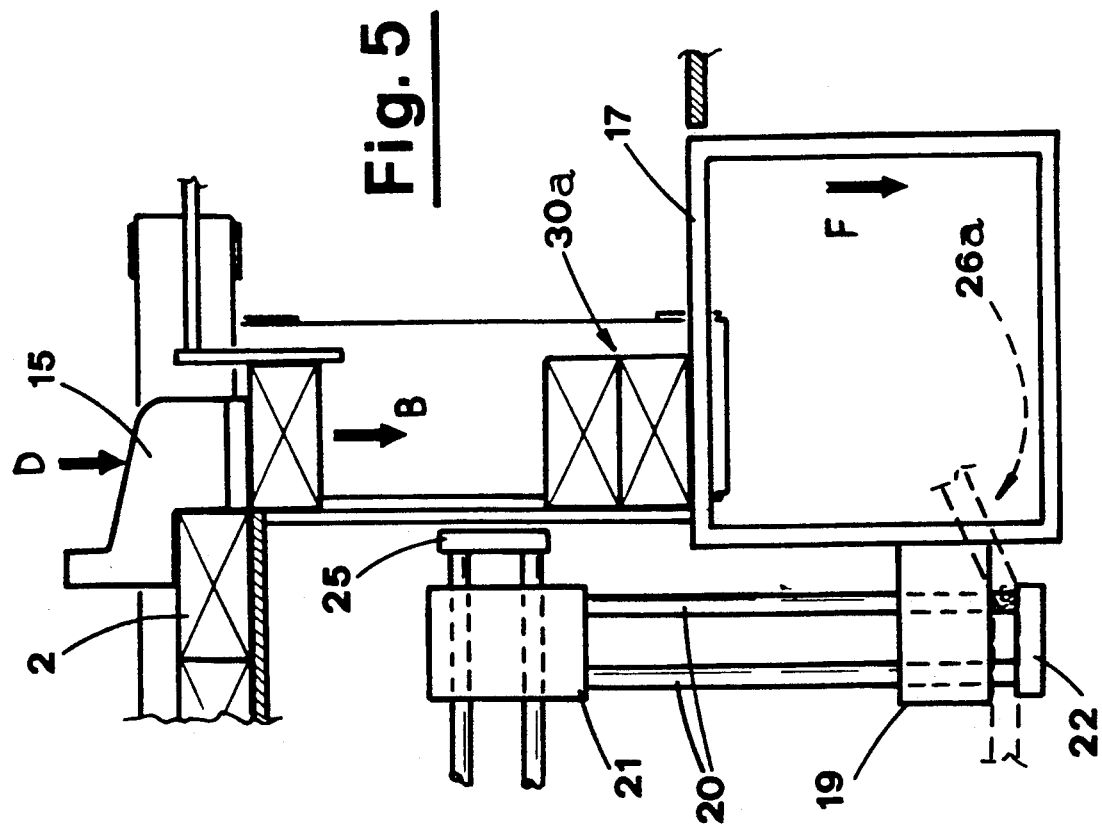

The descent of the frame 17 (arrow F) brings about the corresponding descent of the pile 30a partially formed on its upper surface, as illustrated in FIG. 5. Then the frame 17 is retracted horizontally to the position indicated by the line 17c of short dashes in FIG. 1, by virtue of the return travel of the rocking lever 27.

Figure 6:
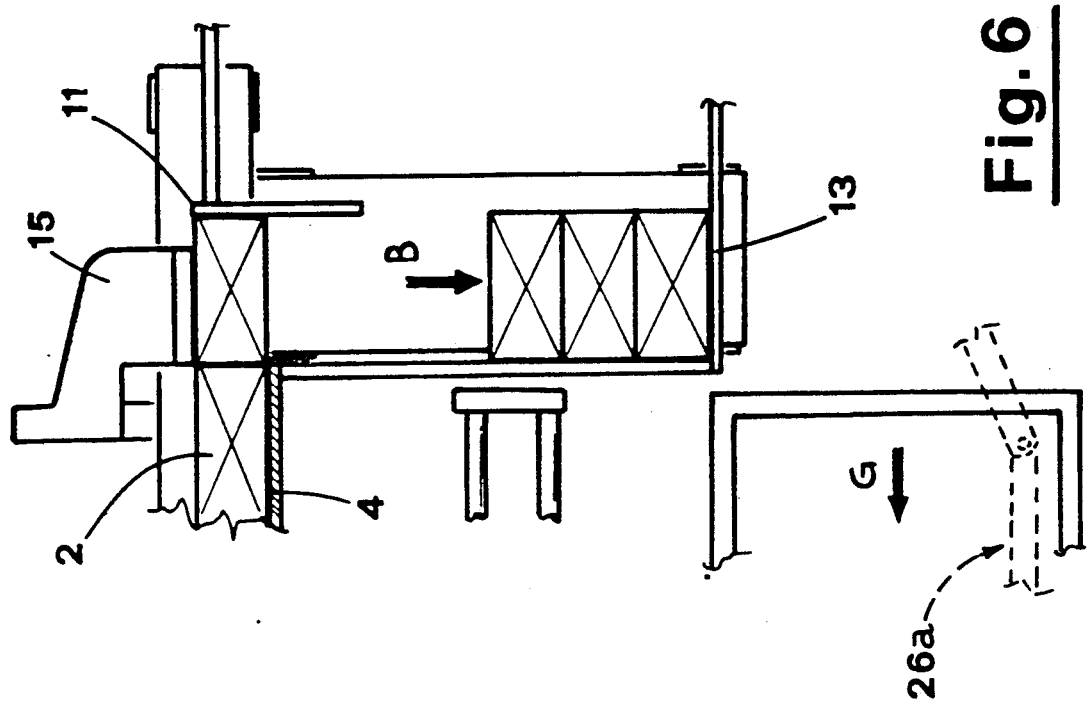

The pile 30a partially formed on the frame 17 goes to rest upon the support plane 13, as illustrated in FIG. 6. The shoulders 12 hold the pile 30a at the rear, so to prevent it from moving in any way owing to the movement of the frame 17 in the sense indicated by the arrow G.

The subsequent return of the means 26 to the raised position brings the frame 17 back to the initial condition, for carrying out the subsequent pile transfer cycle.

Figure 7:
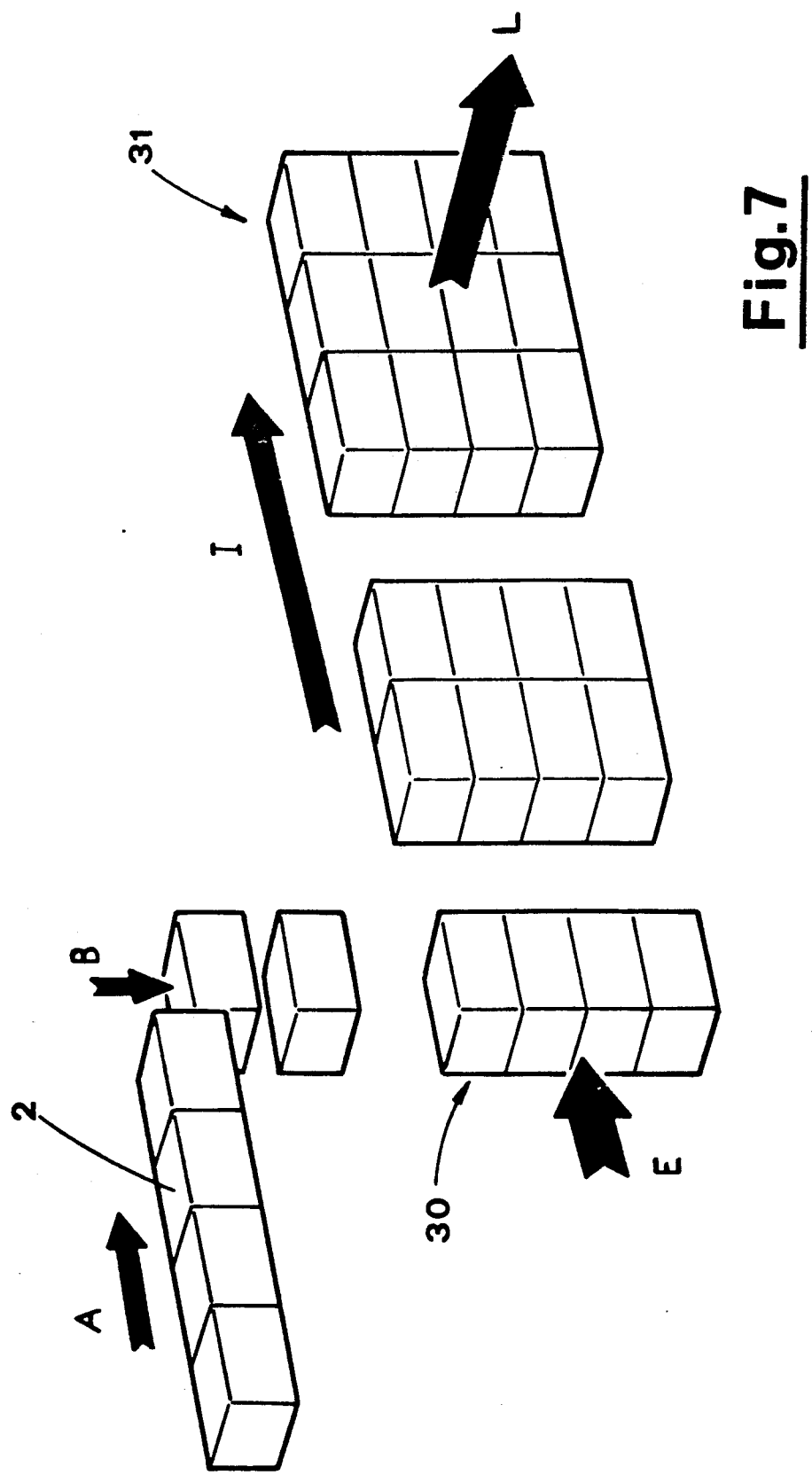
FIG. 7 is a perspective diagram of the positions of said items in phase of forming and transfer of the piles.

The different phases of formation and transfer of the piles are schematically illustrated in FIG. 7, with reference to the positions subsequently occupied by the items 2 which go to form the same piles. The items 2, fed in a row in the horizontal direction A by the line 1, are individually moved to the vertical direction B by the translating means 7, so to form the pile 30; the pile 30 is subsequently moved in the horizontal direction E by the transfer means 16.

It is opportunely provided that the frame 17 of the transfer means 16 may carry out a series of travels E of a reduced length, so to actuate the moving of a certain number of piles close together; and subsequently a longer travel I, for transferring the block of piles so formed, designated by the numeral 31 for the sake of clarity, on the moving-away plane. The whole lot 31 is then moved in the transverse direction L by said cartoning means.

In short, the device provided by the present invention makes it possible to form a vertical pile of items first, and then to transfer said pile to conventional cartoning means.

It should be noticed that the items are held between the conveyor belts 3 and 8 during the formation of the pile, thus ensuring the stability and the orderly lining up of the same pile.

Furthermore, it should be particularly appreciated that the device works non-stop, thus allowing to achieve a very high productivity.

As a matter of fact, during the phase of transfer of the pile just formed, the supply of items is not stopped, on the contrary these latter go to rest upon the frame 17 so starting the formation of the subsequent pile.

It is understood that the above has been described by way of example and it is not restrictive, therefore any other possible embodiment is to be considered as covered by the patent hereby applied for, as described above and as claimed here below.

What is claimed is:

1. A device for forming vertical piles of items delivered successively by a horizontal conveyor means, comprising:

translating means to downwardly displace said items delivered by said horizontal conveyor means;

support means located below said translating means and having an upper surface to support a pile of the items being formed thereon;

vertically movable pushing means located above said translating means and said support means, said pushing means being operable to successively engage an upper surface of each delivered item when said delivered item is positioned above said translating means and to push said delivered item towards said translating means;

transfer means for transferring a pile of said items formed on said upper support surface, said transfer means being provided with a horizontally and vertically movable transfer frame, said transfer frame being moveable horizontally to displace a said delivered item positioned above said translating means and to push said delivered item during a transfer phase, and being moveable vertically into a position below said upper support surface, during a return phase, said transfer frame also supporting a subsequent pile being formed thereon during said transfer phase, as well as depositing said subsequent pile onto said upper support surface during said return phase.

2. A device according to claim 1, wherein said horizontal conveyor means comprises a pair of conveyor belts set side by side and wound around a pair of rollers each having a vertical axis, said belts having respective surfaces facing each other, whereby said items are disposed between said conveyor belts and conveyed.

3. A device according to claim 1, wherein said translating means comprise a pair of conveyor belts set side by side below a downstream end of said horizontal conveyor means, said belts having respective surfaces facing each other, between which said items are taken and conveyed downwards.

4. A device according to claim 1, including a pair of horizontal conveyor belts set side by side along said horizontal conveyor means and wound around a pair of rollers each having a vertical axis, said horizontal belts having respective surfaces facing each other, said items being disposed between said conveyor belts and conveyed, thereby and wherein said translating means comprise;

a pair of vertical conveyor belts set side by side, below a downstream end of said horizontal conveyor means, said vertical belts having respective surfaces facing each other between which said items are taken and conveyed downwards; said horizontal conveyor belts of said horizontal conveyor means extending over said vertical conveyor belts.

5. A device according to claim 1, wherein there is a ledge located over said translating means, said ledge being linearly adjustable in a direction longitudinal to said horizontal conveyor means and being designed to stop said items coming from said horizontal conveyor means.

6. A device according to claim 1, wherein said support means includes a longitudinal slot, said transfer frame passing through said slot while moving during said transfer phase.

7. A device according to claim 1, wherein said transfer frame is slideably guided on vertical guides integral with an upper head, said upper head being slideably guided on horizontal guides, disposed longitudinally to said horizontal conveyor means.

8. A device according to claim 1, wherein said transfer frame is movable in a vertical direction, on vertical guides, by means of an articulate parallelogram linkage.

9. A device according to claim 1, wherein there are two stationary shoulders extending beneath a front end of said horizontal conveyor means in a vertical plane, said shoulders engaging and aligning a rear side surface of a said pile to prevent said pile from moving in any way during said return phase of said transfer frame.

10. A device according to claim 1, wherein said transfer frame is moved in a first path to successively position individual piles close together and in a second path to transfer a group of said individual stacks onto a transport surface.

* * * * *